US012571166B2

(12) United States Patent
Zhang et al.

(10) Patent No.: US 12,571,166 B2

(45) Date of Patent: Mar. 10, 2026

(54) ANTI-ICING LAMINATE MATERIAL AND THE USE THEREOF

(71) Applicant: Dow Global Technologies LLC, Midland, MI (US)

(72) Inventors: Liang Zhang, Shanghai (CN); Wei Li, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 276 days.

(21) Appl. No.: 18/246,947

(22) PCT Filed: Dec. 30, 2020

(86) PCT No.: PCT/CN2020/141161

§ 371 (c)(1),
(2) Date: Mar. 28, 2023

(87) PCT Pub. No.: WO2022/141137

PCT Pub. Date: Jul. 7, 2022

(65) Prior Publication Data

US 2024/0003099 A1 Jan. 4, 2024

(51) Int. Cl.

*E01C 11/24* (2006.01)
*B05D 7/00* (2006.01)

(52) U.S. Cl.

CPC .......... *E01C 11/245* (2013.01); *B05D 7/5883* (2013.01)

(58) Field of Classification Search

CPC ............................ E01C 11/245; B05D 7/5883
See application file for complete search history.

(56) References Cited

U.S. PATENT DOCUMENTS

2017/0167133 A1* 6/2017 Sidheswaran .......... C09K 5/063

FOREIGN PATENT DOCUMENTS

| | | | | |
|---|---|---|---|---|
| CN | 102676056 | | 9/2012 | |
| CN | 102268222 | | 12/2012 | |
| CN | 101701131 | | 2/2013 | |
| CN | 107936919 | | 4/2018 | |
| CN | 111606629 | | 9/2020 | |
| EP | 3560822 | A1 * | 10/2019 | ........... B32B 27/065 |
| WO | WO-2008137147 | A2 * | 11/2008 | ............. B64D 15/00 |
| WO | 2008137147 | | 4/2009 | |
| WO | WO-2019207428 | A2 * | 10/2019 | ........... B32B 27/065 |

OTHER PUBLICATIONS

Yoon, "Thermal Performance Test of a Phase-Change-Material Cool Roof System by a Scaled Model", Advances in Civil Engineering, 2018, pp. 1-11.

* cited by examiner

*Primary Examiner* — Pamela H Weiss

(57) ABSTRACT

A unique laminate comprising a base mat layer, a first sealing layer, a second sealing layer, and a top layer is provided, wherein the unique laminate can effectively inhibit the formation or accumulation of ice or snow on the surface of a substrate while can still achieve superior structural integration and mechanical strength. The use of the laminate material and a method for inhibiting the formation or accumulation of ice or snow on the surface of a substrate are also provided.

7 Claims, 2 Drawing Sheets

ANTI-ICING LAMINATE MATERIAL AND THE USE THEREOF

FIELD OF THE INVENTION

The present disclosure relates to ice control. More specifically, the present disclosure relates to an anti-icing material and a method of fabrication thereof.

BACKGROUND

Some waterborne binder systems, which have the advantages in environmental friendliness, have been developed and used for manufacturing various outdoor facilities such as running track, playground, sports court and the like. These sports surfaces are normally used for outdoor sports activities or pedestrian walkways. Nevertheless, a thin layer of ice or snow may be formed or accumulated onto the surface of such outdoor facilities in a cold weather, which will pose a potential threat to pedestrians, runners and athletes.

Consequently, considerable efforts have been directed into developing surfaces that impede ice formation or have low ice adhesion on the surface, by e.g. surface modification, addition of various anti-icing agents or skid-proof particles, etc. However, these technical means either cannot solve the above technical problem, or will even bring about new issues like environmental pollution, unacceptable cost, inferior structural integrity/strength and liquid seepage. Thus, strategies to prevent icing remain a grand challenge.

After persistent exploration, we have surprisingly developed a laminate material which can achieve the above targets.

SUMMARY OF THE INVENTION

In a first aspect of the present disclosure, the present disclosure provides a unique anti-icing laminate material comprising, in a sequence from bottom to top:

(a) a base mat layer, derived from a first group of raw materials comprising a first waterborne adhesive, a gel of a first phase change material, and first elastic particles;

(b) a first sealing layer, derived from a second group of raw materials comprising a second waterborne adhesive, an emulsion of a second phase change material, and second elastic particles;

(c) a second sealing layer, derived from a third group of raw materials comprising a third waterborne adhesive and third elastic particles; and (d) a top layer derived from a fourth group of raw materials comprising a fourth waterborne adhesive and optional solid filler particles.

According to one embodiment of the first aspect, the laminate material further comprises a primer layer disposed beneath the base mat layer.

According to another embodiment of the first aspect, each of the first, second, third and fourth waterborne adhesives is in the form of an aqueous dispersion and independently comprises water-miscible polymer(s) selected from the group consisting of poly(meth)acrylic polymer, polyurethane, polysiloxane, polyvinyl acetate latex, styrenic resin, styrene-acrylic resin, linseed resin, soya oil resin, alkyd resin and any copolymers or combinations thereof.

According to another embodiment of the first aspect, each of the first and second phase change material is independently selected from the group consisting of silicone phase change material, fully refined paraffin phase change material, half refined paraffin phase change material, organic carboxylic acid phase change material, inorganic salt phase change material, hydrated salt phase change material, and any combinations thereof.

According to another embodiment of the first aspect, neither the first phase change material nor the second phase change material is encapsulated.

According to another embodiment of the first aspect, each of the first, second and third elastic particle is formed by material(s) independently selected from the group consisting of natural rubber, synthetic rubber, polyolefin elastomer, poly(alkylene halide) elastomer, poly(meth)acrylic elastomer, polyurethane elastomer, polystyrene elastomer, polyester elastomer, polyamide elastomer, polysiloxane, soft wood, and any combinations thereof.

According to another embodiment of the first aspect, each of the base mat layer, first sealing layer, second sealing layer and top layer comprises optional additive(s) independently selected from the group consisting of thickener, filler, surfactant, emulsifier, defoamer, promoter, gelling agent, light stabilizer, pigments, dye, strengthening agent, anti-abrasion agent, anti-weathering agent, toughening agent, flow modifier, adhesion promoter, plasticizer, catalyst, catalyst deactivator, anti-mildew agent, and any combinations thereof.

According to another embodiment of the first aspect, the first group of raw materials comprise 10-50 wt % of the first waterborne adhesive, 20-70 wt % of the gel of the first phase change material, and 20-70 wt % of the first elastic particles, based on the total weight of the first group of raw materials.

According to another embodiment of the first aspect, the second group of raw materials comprise 10-50 wt % of the second waterborne adhesive and 10-50 wt % of the emulsion of the second phase change material, and 25-70 wt % of the second elastic particles, based on the total weight of the second group of raw materials.

According to another embodiment of the first aspect, the third group of raw materials comprise 30-70 wt % of the third waterborne adhesive, and 30-70 wt % of the third elastic particles, based on the total weight of the third group of raw materials.

According to another embodiment of the first aspect, the fourth group of raw materials comprise 80-100 wt % of the fourth waterborne adhesive and 0-20 wt % of the solid filler particles, based on the total weight of the fourth group of raw materials.

In a second aspect of the present disclosure, the present disclosure provides a use of the anti-icing laminate material of the present disclosure for inhibiting the formation or accumulation of ice or snow on the surface of a substrate.

In a third aspect of the present disclosure, the present disclosure provides a method for inhibiting the formation or accumulation of ice or snow on the surface of a substrate, comprising applying the following layers in sequence above the surface of the substrate:

(a) a base mat layer, derived from a first group of raw materials comprising a first waterborne adhesive, a gel of a first phase change material, and first elastic particles;

(b) a first sealing layer, derived from a second group of raw materials comprising a second waterborne adhesive, an emulsion of a second phase change material, and second elastic particles;

(c) a second sealing layer, derived from a third group of raw materials comprising a third waterborne adhesive and third elastic particles; and (d) a top layer derived from a fourth group of raw materials comprising a fourth waterborne adhesive and optional solid filler particles.

According to another embodiment of the third aspect, the method further comprises applying a primer layer onto the surface of the article before applying in sequence the base mat layer, the first sealing layer, the second sealing layer, and the top layer.

It is to be understood that both the foregoing general description and the following detailed description are exemplary and explanatory only and are not restrictive of the invention, as claimed.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated.

The anti-icing laminate material of the present disclosure can be disposed directly or indirectly onto the (outer) surface of a substrate so as to inhibit the formation and accumulation of ice, or the accumulation of snow on the surface.

It is to be understood that in all the embodiments throughout the present disclosure, the term "inhibit" refers to delaying, partially preventing (i.e., reducing), or completely preventing the formation or accumulation of ice or snow on a surface.

The substrate may be selected from the group consisting of running track, playground, sports court, street, pavement, expressway, airstrip, park, village vacant land, lane, building roof, and building external surface. The substrate may be of a material selected from the group consisting of stone, cement, concrete, gravel, soil, asphalt, wood, plastic material (polystyrene, polyethylene, ABS, polyurethane, polyethylene terephthalate, polybutylene terephthalate, polypropylene, polyphenylene, polycarbonate, polyacrylate, PVC, polysulfone), polymer-filler composite material, and any combinations thereof.

Figure 1:
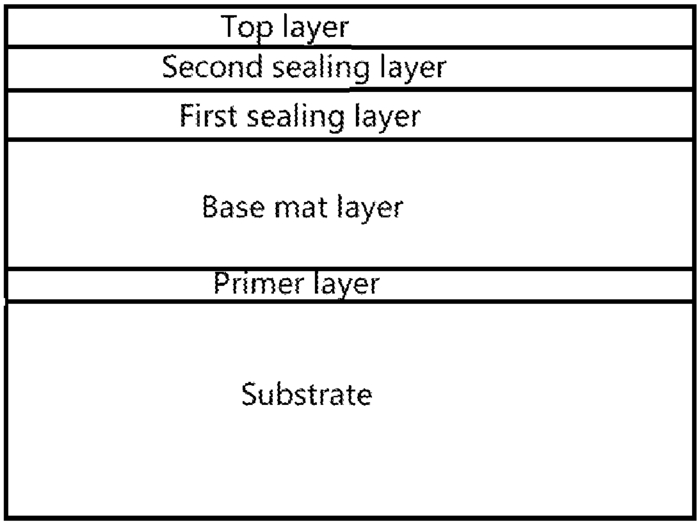
FIG. 1 shows a schematic sectional view of an anti-icing laminate material of the present disclosure.

FIG. 1 shows a schematic sectional view of an anti-icing laminate material of the present disclosure. As can be seen, the anti-icing laminate material of the present disclosure comprises in a sequence from bottom to top (a) a base mat layer, (b) a first sealing layer, (c) a second sealing layer, and (d) a top layer. The base mat layer (a) may be directly disposed onto the surface of the substrate, or with a primer layer sandwiched therebetween, wherein the primer layer can be applied for achieving one or more of the following functions: shock damping, physical shielding, enhancement of compatibility between the substrate and the anti-icing laminate material, blockage of water/moisture, anti-corrosion, wear-resistance, etc. According to one embodiment of the present disclosure, there is no primer layer, and the anti-icing laminate material of the present disclosure is directly disposed onto the surface of the substrate. According to one embodiment of the present disclosure, a primer layer is applied onto the surface of the substrate before the applying, in sequence, of the base mat layer, the first sealing layer, the second sealing layer, and the top layer. According to an embodiment of the present application, the primer can be an ordinary primer for the above said substrate such as polyurethane primer, polyacrylic primer, epoxy primer, polyurea primer, and may comprise any ordinary additives such as ceramic beads, pigments, etc. According to another embodiment of the present application, the primer layer may have a thickness of 0.1 to 0.5 mm, such as 0.15 to 0.45 mm, or from 0.20 to 0.40 mm, or from 0.25 to 0.35 mm, or from 0.28 to 0.32 mm, or from 0.30 to 0.31 mm.

Besides, one or more other layers, such as covering layer, protection layer or cladding layer can be applied onto the top of the top layer so as to provide protection function or other functions.

According to some embodiments of the present disclosure, the laminate material and the method for preparing the same are "waterborne" and are preferably "free of any organic solvent". Preferably, the raw materials used for each layers of the laminate material only comprise water as the sole solvent, and is preferably free of any organic solvent, thus the laminate material can effectively prevent the emission of VOC (volatile organic compounds) during the preparation and use of the laminate material.

The Base Mat Layer

According to some embodiments of the present disclosure, the base mat layer (a) can be prepared by applying a mixture of a first group of raw materials onto the top of the substrate or the primer layer to form a wet/green (uncured) base mat layer, and then drying/curing the wet/green (uncured) base mat layer or allowing it to dry/cure.

According to one embodiment of the present disclosure, the drying/curing of each of the primer layer, the base mat layer, the first sealing layer, the second sealing layer, the top layer and any other layers can be conducted immediately after the applying of one specific layer and before the applying of the next layer. Alternatively, two or more of the above layers, or all of the above layers can be dried/cured once at the same time.

The mixture of a first group of raw materials can be in the form of a dispersion, a suspension, an emulsion or a slurry. According to one embodiment of the present application, the mixture of a first group of raw materials only comprises water as the sole solvent and is completely free of any organic solvent.

The first group of raw materials comprise a first waterborne adhesive, a gel of a first phase change material, first elastic particles, and optional additive(s) selected from the group consisting of thickener, filler, surfactant, chain transferring agent, emulsifier, promoter, gelling agent, light stabilizer, pigments, dye, strengthening agent, anti-abrasion agent, anti-weathering agent, toughening agent, flow modifier, adhesion promoter, plasticizer, catalyst, catalyst deactivator, anti-mildew agent, and any combinations thereof.

According to one embodiment of the present disclosure, the content of the first waterborne adhesive can be from 10 wt % to 50 wt %, based on the total weight of the first group of raw materials. For example, the content of the first waterborne adhesive can be from 11 wt % to 49 wt %, or in a numerical range obtained by combining any two of the following percentage values: 11 wt %, or 12 wt %, or 13 wt %, or 14 wt %, or 15 wt %, or 16 wt %, or 17 wt %, or 18 wt %, or 19 wt %, or 20 wt %, or 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %.

According to one embodiment of the present disclosure, the first waterborne adhesive can be in the form of an aqueous dispersion, suspension, emulsion, latex, or slurry, and having a solid content of 20 wt % to 60 wt %, based on the total weight of the first waterborne adhesive, such as having a solid content from 25 wt % to 50 wt %, or from 30 wt % to 40 wt %, or in a numerical range obtained by combining any two of the following percentage values: 20 wt %, or 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %, or 51 wt %, or 52 wt %, or 53 wt %, or 54 wt %, or 55 wt %, or 56 wt %, or 57 wt %, or 58 wt %, or 59 wt %, or 60 wt %. The solid component in the first waterborne adhesive comprises water-miscible polymer(s) selected from the group consisting of poly(meth) acrylic polymer, polyurethane, polysiloxane, polyvinyl acetate latex, styrenic resin, styrene-acrylic resin, linseed resin, soya oil resin, alkyd resin and any copolymers or combinations thereof. Preferably the solid component in the first waterborne adhesive is a poly(meth)acrylic polymer or a copolymer thereof, and the first waterborne adhesive is a waterborne acrylic adhesive.

"Acrylic" in the present invention includes (meth)acrylic acid, alkyl (meth)acrylate, (meth)acrylamide, (meth)acrylnitrile and their modified forms such as hydroxyalkyl (meth) acrylate. Throughout this application, the designation "(meth)acryl" refers to both "methacryl" and "acryl". For example, (meth)acrylic acid refers to both methacrylic acid and acrylic acid, and methyl (meth)acrylate refers to both methyl methacrylate and methyl acrylate. According to an embodiment of the present application, the first waterborne adhesive is a waterborne acrylic adhesive derived from the polymerization of one or more acrylic monomer selected from the group consisting of acrylic acid, methacrylic acid, hydroxyethyl methacrylate, methyl acrylate, methyl methacrylate, ethyl acrylate, butyl acrylate, butyl methacrylate, 2-ethylhexyl acrylate, 3-butanediol dimethacrylate, acrylonitrile, iso-butyl (meth)acrylate, hexyl(meth)acrylate, lauryl (meth)acrylate, stearyl (meth)acrylate, cyclohexyl (meth) acrylate, benzyl(meth)acrylate, oleyl(meth)acrylate, palmityl(meth)acrylate, nonyl(meth)acrylate, decyl(meth) acrylate, dodecyl (meth)acrylate, pentadecyl(meth)acrylate, hexadecyl(meth)acrylate, octadecyl(meth)acrylate, hydroxyethyl (meth)acrylate, hydroxypropyl (meth)acrylate, acrylamide, methacrylamide, allyl(meth)acrylate, 2-methylallyl(meth)acrylate, allyl(meth)acrylamide, 2-methylallyl(meth)acrylamide, allyl oxyethyl (meth)acrylate, 2-methylallyl oxyethyl (meth)acrylate, crotyl(meth) acrylate, dicyclopentenyl(meth)acrylate, dicyclopentenyl ethyl (meth)acrylate, and diallyl maleate. Ordinary additives, such as catalyst, cocatalyst, chain transferring agent, initiator or surfactant, can be properly introduced during the above said polymerization. According to another embodiment of the present disclosure, the waterborne acrylic adhesive comprises from an acrylic emulsion (co)polymer having a Tg of at least 15° C. and an acrylic emulsion (copolymer) having a Tg of −5° C. or less.

According to one embodiment of the present disclosure, the content of the first phase change material can be from 20 wt % to 70 wt %, based on the total weight of the first group of raw materials. For example, the content of the first phase change material can be from 21 wt % to 69 wt %, or in a numerical range obtained by combining any two of the following percentage values: 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %, or 51 wt %, or 52 wt %, or 53 wt %, or 54 wt %, or 55 wt %, or 56 wt %, or 57 wt %, or 58 wt %, or 59 wt %, or 60 wt %, or 61 wt %, or 62 wt %, or 63 wt %, or 64 wt %, or 65 wt %, or 66 wt %, or 67 wt %, or 68 wt %, or 69 wt %.

According to one embodiment of the present disclosure, the first phase change material is present in the form of a gel, especially a hydrogel, and has a water content of 3 wt % to 40 wt %, based on the total weight of the first phase change material gel, such as having a water content from 5 wt % to 38 wt %, or from 8 wt % to 30 wt %, or in a numerical range obtained by combining any two of the following percentage values: 3 wt %, or 4 wt %, or 5 wt %, or 6 wt %, or 7 wt %, or 8 wt %, or 9 wt %, or 10 wt %, or 11 wt %, or 12 wt %, or 13 wt %, or 14 wt %, or 15 wt %, or 16 wt %, or 17 wt %, or 18 wt %, or 19 wt %, or 20 wt %, or 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %.

The first phase change material is selected from the group consisting of silicone phase change material, fully refined paraffin phase change material, half refined paraffin phase change material, organic carboxylic acid phase change material, inorganic salt phase change material, hydrated salt phase change material, and any combinations thereof. According to an embodiment of the present disclosure, the phase change material has a melting point no lower than the freezing point of water, such as having a melting point of 0 to 30° C. According to an embodiment of the present disclosure, the first phase change material is selected from the group consisting of cyclohexane, peanut oil, corn oil, eucalyptol, fennel oil, 2'-hydroxy-acetophenone, ethyl cinnamate, octanoic acid, anise oil, cyclohexanol, cyclooctane, pentadecane, hexadecane, tetradecane, 2-heptyne, n-dodecyl acetate, oleic acid, 2,2-dimethyl-3-pentanol, bicyclohexyl, DMSO, ethylene glycol, paraffin, neopentyl glycol, dodecanol, trimethylolpropane, graphene, glycerol, polysiloxane, modified polysiloxane, polysiloxane-acrylate copolymer, polysiloxane-amide copolymer, polysiloxane-epoxy copolymer, polysiloxane-ether copolymer, polysiloxane-urethane copolymer, polysiloxane-urea copolymer, polysiloxane-vinyl ether copolymer, polyethylene, polypropylene, sodium chloride, calcium chloride, magnesium chloride, ammonium chloride, and any combinations thereof.

According to an embodiment of the present disclosure, the first phase change material is present in the form of a gel directly dispersed, such as uniformly dispersed within the base mat layer (a) without being encapsulated by any outer layer, such as outer film, cladding, capsules, etc.

According to an embodiment of the present disclosure, the gel of the first phase change material can be prepared by: (a) mixing the first phase change material with aqueous solvent/diluent (water, more preferably deionized water) and one or more of the above stated additives, such as thickener, surfactant and pH adjuster (e.g. acid and base) to produce an emulsion of the first phase change material; and then (b) incorporating a binder/gelling agent into the emulsion to form a gel (such as a hydrogel) of the first phase change material. According to an embodiment of the present application, the binder can be one or more of the above said water-miscible polymer(s) for the first waterborne adhesive. More preferably, the binder comprises a polyurethane binder or an isocyanate prepolymer binder.

According to one embodiment of the present disclosure, the content of the first elastic particles can be from 20 wt % to 70 wt %, based on the total weight of the first group of raw materials. For example, the content of the first elastic particles can be from 21 wt % to 69 wt %, or in a numerical range obtained by combining any two of the following percentage values: 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %, or 51 wt %, or 52 wt %, or 53 wt %, or 54 wt %, or 55 wt %, or 56 wt %, or 57 wt %, or 58 wt %, or 59 wt %, or 60 wt %, or 61 wt %, or 62 wt %, or 63 wt %, or 64 wt %, or 65 wt %, or 66 wt %, or 67 wt %, or 68 wt %, or 69 wt %.

According to one embodiment of the present disclosure, the first elastic particle is formed by material(s) selected from the group consisting of natural rubber, synthetic rubber, polyolefin elastomer, poly(alkylene halide) elastomer, poly(meth)acrylic elastomer, polyurethane elastomer, polystyrene elastomer, polyester elastomer, polyamide elastomer, polysiloxane, soft wood, and any combinations thereof. According to an embodiment of the present application, the first elastic particle is formed by material(s) selected from the group consisting of natural rubber, synthetic polyisoprene (IR), polybutadiene (BR), styrene-butadiene rubber (copolymer of polystyrene and polybutadiene, SBR), nitrile rubber (copolymer of polybutadiene and acrylnitrile, NBR), chloroprene rubber (CR), isobutylene isoprene rubber (IIR), butyl rubber, halogenated butyl rubbers, chloro isobutylene isoprene rubber (CIIR), bromo isobutylene isoprene rubber (BIIR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI), fluorosilicone rubber (FVMQ), fluoroelastomers (FEPM), chlorosulfonated polyethylene (CSM), hydrogenated nitrile rubbers (HNBR), thermoplastic elastomer-olefin (TPE-O), styrenic thermoplastic elastomer (TPE-S), thermoplastic polyurethane elastomer (TPE-U), thermoplastic polyester elastomer (TPE-E), polyamide thermoplastic elastomer (TPE-A), thermoplastic halogenated elastomer, ionic thermoplastic elastomer, ethylene copolymer thermoplastic elastomer) (EVA), thermoplastic 1,2-poly-butadiene elastomer, thermoplastic trans-polyisoprene elastomer, melt processible thermoplastic elastomer (Alcryn), thermoplastic vulcanizates (TPV), and any combinations thereof.

According to one embodiment of the present disclosure, the base mat layer can be formed by mixing the first waterborne adhesive, the gel of a first phase change material, the first elastic particles and any optional additives to form a mixture of the first group of raw materials, wherein the mixture can be properly handled by stirring, shearing, concentrating, dilution, compatibilization, or modification with adjuvant(s) so as to achieve consistency and flowability suitable for storage, transportation, and application by ordinary coating technologies such as spraying coating, blade coating, curtain coating, flow coating, slit coating, die coating, dip coating, and the like. Then the mixture of the first group of raw materials is applied onto the surface of the substrate or the primer to form a wet (green/uncured) base mat layer, followed by drying, curing or allowing it to dry. According to one embodiment of the present application, the base mat layer may have a thickness of 5 to 20 mm, such as 6 to 19 mm, or from 7 to 18 mm, or from 8 to 16 mm, or from 10 to 15 mm, or from 11 to 14 mm, or from 12 to 13 mm.

The First Sealing layer

According to some embodiments of the present disclosure, the first sealing layer (b) can be prepared by applying a mixture of a second group of raw materials onto the top of the base mat layer to form a wet/green (uncured) first sealing layer, and then curing the wet/green (uncured) first sealing layer or allowing it to cure. The mixture of the second group of raw materials can be in the form of a dispersion, a suspension, an emulsion or a slurry. According to one embodiment of the present application, the mixture of the second group of raw materials only comprises water as the sole solvent and is completely free of any organic solvent.

The second group of raw materials comprise a second waterborne adhesive, an emulsion of a second phase change material, second elastic particles, and optional additive(s) selected from the group consisting of thickener, filler, surfactant, promoter, gelling agent, light stabilizer, pigments, dye, strengthening agent, anti-abrasion agent, anti-weathering agent, toughening agent, flow modifier, adhesion promoter, plasticizer, catalyst, catalyst de-activator, anti-mildew agent, and any combinations thereof.

According to one embodiment of the present disclosure, the content of the second waterborne adhesive can be from 10 wt % to 50 wt %, based on the total weight of the second group of raw materials. For example, the content of the second waterborne adhesive can be from 11 wt % to 49 wt %, or in a numerical range obtained by combining any two of the following percentage values: 11 wt %, or 12 wt %, or 13 wt %, or 14 wt %, or 15 wt %, or 16 wt %, or 17 wt %, or 18 wt %, or 19 wt %, or 20 wt %, or 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %.

According to one embodiment of the present disclosure, the second waterborne adhesive can be in the form of an aqueous dispersion, suspension, emulsion, latex, or slurry, and having a solid content of 20 wt % to 60 wt %, based on the total weight of the second waterborne adhesive, such as having a solid content from 25 wt % to 50 wt %, or from 30 wt % to 40 wt %, or in a numerical range obtained by combining any two of the following percentage values: 20 wt %, or 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %, or 51 wt %, or 52 wt %, or 53 wt %, or 54 wt %, or 55 wt %, or 56 wt %, or 57 wt %, or 58 wt %, or 59 wt %, or 60 wt %. The solid component in the second waterborne adhesive comprises water-miscible polymer(s) selected from the group consisting of poly(meth) acrylic polymer, polyurethane, polysiloxane, polyvinyl acetate latex, styrenic resin, styrene-acrylic resin, linseed resin, soya oil resin, alkyd resin and any copolymers or combinations thereof. Preferably the solid component in the second waterborne adhesive is a poly(meth)acrylic polymer or a copolymer thereof, and the second waterborne adhesive is a waterborne acrylic adhesive.

According to an embodiment of the present application, the second waterborne adhesive is a waterborne acrylic adhesive derived from the polymerization of one or more acrylic monomer selected from the group consisting of acrylic acid, methacrylic acid, hydroxyethyl methacrylate, methyl acrylate, methyl methacrylate, ethyl acrylate, butyl acrylate, butyl methacrylate, 2-ethylhexyl acrylate, 3-butanediol dimethacrylate, acrylonitrile, iso-butyl (meth)acrylate, hexyl(meth)acrylate, lauryl (meth)acrylate, stearyl (meth)acrylate, cyclohexyl (meth)acrylate, benzyl(meth) acrylate, oleyl(meth)acrylate, palmityl(meth)acrylate, nonyl (meth)acrylate, decyl(meth)acrylate, dodecyl (meth)acrylate, pentadecyl(meth)acrylate, hexadecyl(meth)acrylate, octadecyl(meth)acrylate, hydroxyethyl (meth)acrylate, hydroxypropyl (meth)acrylate, acrylamide, methacrylamide, allyl(meth)acrylate, 2-methylallyl(meth)acrylate, allyl (meth)acrylamide, 2-methylallyl(meth)acrylamide, allyl oxyethyl (meth)acrylate, 2-methylallyl oxyethyl (meth)acrylate, crotyl(meth)acrylate, dicyclopentenyl(meth)acrylate, dicyclopentenyl ethyl (meth)acrylate, and diallyl maleate. Ordinary additives, such as catalyst, cocatalyst, chain transferring agent, initiator or surfactant, can be properly introduced during the above said polymerization. According to another embodiment of the present disclosure, the waterborne acrylic adhesive comprises from an acrylic emulsion (co)polymer having a Tg of at least 15° C. and an acrylic emulsion (copolymer) having a Tg of −5° C. or less.

According to one embodiment of the present disclosure, the content of the second phase change material can be from 10 wt % to 50 wt %, based on the total weight of the second group of raw materials. For example, the content of the second phase change material can be from 11 wt % to 49 wt %, or in a numerical range obtained by combining any two of the following percentage values: 10 wt %, 11 wt %, or 12 wt %, or 13 wt %, or 14 wt %, or 15 wt %, or 16 wt %, or 17 wt %, or 18 wt %, or 19 wt %, or 20 wt %, or 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %.

According to one embodiment of the present disclosure, the second phase change material is present in the form of an emulsion, especially an aqueous emulsion, and has a water content of 20 wt % to 70 wt %, based on the total weight of the second phase change material emulsion, such as having a water content from 22 wt % to 60 wt %, or from 40 wt % to 59 wt %, or in a numerical range obtained by combining any two of the following percentage values: 20 wt %, or 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %, or 51 wt %, or 52 wt %, or 53 wt %, or 54 wt %, or 55 wt %, or 56 wt %, or 57 wt %, or 58 wt %, or 59 wt %, or 60 wt %, or 61 wt %, or 62 wt %, or 63 wt %, or 64 wt %, or 65 wt %, or 66 wt %, or 67 wt %, or 68 wt %, or 69 wt %.

The second phase change material is selected from the group consisting of silicone phase change material, fully refined paraffin phase change material, half refined paraffin phase change material, organic carboxylic acid phase change material, inorganic salt phase change material, hydrated salt phase change material, and any combinations thereof. According to an embodiment of the present disclosure, the second phase change material has a melting point no lower than the freezing point of water, such as having a melting point of 0 to 30° C. According to an embodiment of the present disclosure, the second phase change material is selected from the group consisting of cyclohexane, peanut oil, corn oil, eucalyptol, fennel oil, 2'-hydroxy-acetophenone, ethyl cinnamate, octanoic acid, anise oil, cyclohexanol, cyclooctane, pentadecane, hexadecane, tetradecane, 2-heptyne, n-dodecyl acetate, oleic acid, 2,2-dimethyl-3-pentanol, bicyclohexyl, DMSO, ethylene glycol, paraffin, neopentyl glycol, dodecanol, trimethylolpropane, graphene, glycerol, polysiloxane, modified polysiloxane, polysiloxane-acrylate copolymer, polysiloxane-amide copolymer, polysiloxane-epoxy copolymer, polysiloxane-ether copolymer, polysiloxane-urethane copolymer, polysiloxane-urea copolymer, polysiloxane-vinyl ether copolymer, polyethylene, polypropylene, sodium chloride, calcium chloride, magnesium chloride, ammonium chloride, and any combinations thereof.

According to an embodiment of the present disclosure, the second phase change material is present in the form of an emulsion directly dispersed, such as uniformly dispersed, within the first sealing layer (b) without being encapsulated by any outer layer, such as outer film, cladding, capsules, etc.

According to an embodiment of the present disclosure, the emulsion of the second phase change material can be prepared by mixing the second phase change material with aqueous solvent/diluent (water, more preferably deionized water) and one or more of the above stated additives, such as thickener, surfactant and pH adjuster (e.g. acid and base).

According to one embodiment of the present disclosure, the content of the second elastic particles can be from 25 wt % to 70 wt %, based on the total weight of the second group of raw materials. For example, the content of the second elastic particles can be from 25 wt % to 69 wt %, or in a numerical range obtained by combining any two of the following percentage values: 25 wt %, 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %, or 51 wt %, or 52 wt %, or 53 wt %, or 54 wt %, or 55 wt %, or 56 wt %, or 57 wt %, or 58 wt %, or 59 wt %, or 60 wt %, or 61 wt %, or 62 wt %, or 63 wt %, or 64 wt %, or 65 wt %, or 66 wt %, or 67 wt %, or 68 wt %, or 69 wt %, or 70 wt %.

According to one embodiment of the present disclosure, the second elastic particle is formed by material(s) selected from the group consisting of natural rubber, synthetic rubber, polyolefin elastomer, poly(alkylene halide) elastomer, poly(meth)acrylic elastomer, polyurethane elastomer, polystyrene elastomer, polyester elastomer, polyamide elastomer, polysiloxane, soft wood, and any combinations thereof. According to an embodiment of the present application, the second elastic particle is formed by material(s) selected from the group consisting of natural rubber, synthetic polyisoprene (IR), polybutadiene (BR), styrene-butadiene rubber (copolymer of polystyrene and polybutadiene, SBR), nitrile rubber (copolymer of polybutadiene and acrylonitrile, NBR), chloroprene rubber (CR), isobutylene isoprene rubber (IIR), butyl rubber, halogenated butyl rubbers, chloro isobutylene isoprene rubber (CIIR), bromo isobutylene isoprene rubber (BIIR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI), fluorosilicone rubber (FVMQ), fluoroelastomers (FEPM), chlorosulfonated polyethylene (CSM), hydrogenated nitrile rubbers (HNBR), thermoplastic elastomer-olefin (TPE-O), styrenic thermoplastic elastomer (TPE-S), thermoplastic polyurethane elastomer (TPE-U), thermoplastic polyester elastomer (TPE-E), polyamide thermoplastic elastomer (TPE-A), thermoplastic halogenated elastomer, ionic thermoplastic elastomer, ethylene copolymer thermoplastic elastomer) (EVA), thermoplastic 1,2-poly-butadiene elastomer, thermoplastic trans-polyisoprene elastomer, melt processible thermoplastic elastomer (Alcryn), thermoplastic vulcanizates (TPV), and any combinations thereof.

According to one embodiment of the present disclosure, the first sealing layer can be formed by mixing the second waterborne adhesive, the emulsion of a second phase change material, the second elastic particles and any optional additives to form a mixture of the second group of raw materials, wherein the mixture can be properly handled by stirring, shearing, concentrating, dilution, compatibilization, or modification with adjuvant(s) so as to achieve consistency and flowability suitable for storage, transportation, and application by ordinary coating technologies such as spraying coating, blade coating, curtain coating, flow coating, slit coating, die coating, dip coating, and the like. Then the mixture of the second group of raw materials is applied onto the surface of the base mat layer to form a wet (green/uncured) first sealing layer, followed by drying, curing or allowing it to dry. According to one embodiment of the present application, the first sealing layer may have a thickness of to 3 mm, such as 1 to 2.5 mm, or from 1.5 to 2.0 mm, or from 1.6 to 1.9 mm The Second Sealing Layer According to some embodiments of the present disclosure, the second sealing layer (c) can be prepared by applying a mixture of a third group of raw materials onto the top of the first sealing layer to form a wet/green (uncured) second sealing layer, and then curing the wet/green (uncured) second sealing layer or allowing it to cure. The mixture of the third group of raw materials can be in the form of a dispersion, a suspension, an emulsion or a slurry. According to one embodiment of the present application, the mixture of the third group of raw materials only comprises water as the sole solvent and is completely free of any organic solvent.

The third group of raw materials comprise a third waterborne adhesive, third elastic particles, and optional additive (s) selected from the group consisting of thickener, filler, surfactant, emulsifier, defoamer, promoter, gelling agent, light stabilizer, pigments, dye, strengthening agent, anti-abrasion agent, anti-weathering agent, toughening agent, flow modifier, adhesion promoter, plasticizer, catalyst, catalyst de-activator, anti-mildew agent, and any combinations thereof.

According to one embodiment of the present disclosure, the content of the third waterborne adhesive can be from 30 wt % to 70 wt %, based on the total weight of the third group of raw materials. For example, the content of the third waterborne adhesive can be from 31 wt % to 69 wt %, or in a numerical range obtained by combining any two of the following percentage values: 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %, or 51 wt %, or 52 wt %, or 53 wt %, or 54 wt %, or 55 wt %, or 56 wt %, or 57 wt %, or 58 wt %, or 59 wt %, or 60 wt %, or 61 wt %, or 62 wt %, or 63 wt %, or 64 wt %, or 65 wt %, or 66 wt %, or 67 wt %, or 68 wt %, or 69 wt %, or 70 wt %.

According to one embodiment of the present disclosure, the third waterborne adhesive can be in the form of an aqueous dispersion, suspension, emulsion, latex, or slurry, and having a solid content of 20 wt % to 60 wt %, based on the total weight of the third waterborne adhesive, such as having a solid content from 25 wt % to 50 wt %, or from 30 wt % to 40 wt %, or in a numerical range obtained by combining any two of the following percentage values: 20 wt %, or 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %, or 51 wt %, or 52 wt %, or 53 wt %, or 54 wt %, or 55 wt %, or 56 wt %, or 57 wt %, or 58 wt %, or 59 wt %, or 60 wt %. The solid component in the third waterborne adhesive comprises water-miscible polymer(s) selected from the group consisting of poly(meth)acrylic polymer, polyurethane, polysiloxane, polyvinyl acetate latex, styrenic resin, styrene-acrylic resin, linseed resin, soya oil resin, alkyd resin and any copolymers or combinations thereof. Preferably the solid component in the third waterborne adhesive is a poly(meth)acrylic polymer or a copolymer thereof, and the third waterborne adhesive is a waterborne acrylic adhesive.

According to an embodiment of the present application, the third waterborne adhesive is a waterborne acrylic adhesive derived from the polymerization of one or more acrylic monomer selected from the group consisting of acrylic acid, methacrylic acid, hydroxyethyl methacrylate, methyl acrylate, methyl methacrylate, ethyl acrylate, butyl acrylate, butyl methacrylate, 2-ethylhexyl acrylate, 3-butanediol dimethacrylate, acrylonitrile, iso-butyl (meth)acrylate, hexyl (meth)acrylate, lauryl (meth)acrylate, stearyl (meth)acrylate, cyclohexyl (meth)acrylate, benzyl(meth)acrylate, oleyl (meth)acrylate, palmityl(meth)acrylate, nonyl(meth) acrylate, decyl(meth)acrylate, dodecyl (meth)acrylate, pentadecyl(meth)acrylate, hexadecyl(meth)acrylate, octadecyl(meth)acrylate, hydroxyethyl (meth)acrylate, hydroxypropyl (meth)acrylate, acrylamide, methacrylamide, allyl (meth)acrylate, 2-methylallyl(meth)acrylate, allyl(meth) acrylamide, 2-methylallyl(meth)acrylamide, allyl oxyethyl (meth)acrylate, 2-methylallyl oxyethyl (meth)acrylate, crotyl(meth)acrylate, dicyclopentenyl(meth)acrylate, dicyclopentenyl ethyl (meth)acrylate, and diallyl maleate. Ordinary additives, such as catalyst, cocatalyst, chain transferring agent, initiator or surfactant, can be properly introduced during the above said polymerization. According to another embodiment of the present disclosure, the waterborne acrylic adhesive comprises from an acrylic emulsion (co) polymer having a Tg of at least 15° C. and an acrylic emulsion (copolymer) having a Tg of −5° C. or less.

According to an embodiment of the present disclosure, the second sealing layer is free of any phase change material. According to another embodiment of the present disclosure, the laminate material of the present disclosure comprises a phase change material "gel" in the base mat layer, a phase change material "emulsion" in the first sealing layer, and is free of any phase change material in the second sealing layer and the top layer. Without being limited to theory, it is believed that such a particularly designed distribution of the phase change material in each layer of the laminate material is beneficial for achieving superior anti-icing property, improved structure integrity/strength and inhibited liquid seepage.

According to one embodiment of the present disclosure, the content of the third elastic particles can be from 30 wt % to 70 wt %, based on the total weight of the third group of raw materials. For example, the content of the third elastic particles can be from 31 wt % to 69 wt %, or in a numerical range obtained by combining any two of the following percentage values: 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %, or 51 wt %, or 52 wt %, or 53 wt %, or 54 wt %, or 55 wt %, or 56 wt %, or 57 wt %, or 58 wt %, or 59 wt %, or 60 wt %, or 61 wt %, or 62 wt %, or 63 wt %, or 64 wt %, or 65 wt %, or 66 wt %, or 67 wt %, or 68 wt %, or 69 wt %, or 70 wt %.

According to one embodiment of the present disclosure, the third elastic particle is formed by material(s) selected from the group consisting of natural rubber, synthetic rubber, polyolefin elastomer, poly(alkylene halide) elastomer, poly(meth)acrylic elastomer, polyurethane elastomer, polystyrene elastomer, polyester elastomer, polyamide elastomer, polysiloxane, soft wood, and any combinations thereof. According to an embodiment of the present application, the third elastic particle is formed by material(s) selected from the group consisting of natural rubber, synthetic polyisoprene (IR), polybutadiene (BR), styrene-butadiene rubber (copolymer of polystyrene and polybutadiene, SBR), nitrile rubber (copolymer of polybutadiene and acrylonitrile, NBR), chloroprene rubber (CR), isobutylene isoprene rubber (IIR), butyl rubber, halogenated butyl rubbers, chloro isobutylene isoprene rubber (CIIR), bromo isobutylene isoprene rubber (BIIR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI), fluorosilicone rubber (FVMQ), fluoroelastomers (FEPM), chlorosulfonated polyethylene (CSM), hydrogenated nitrile rubbers (HNBR), thermoplastic elastomer-olefin (TPE-O), styrenic thermoplastic elastomer (TPE-S), thermoplastic polyurethane elastomer (TPE-U), thermoplastic polyester elastomer (TPE-E), polyamide thermoplastic elastomer (TPE-A), thermoplastic halogenated elastomer, ionic thermoplastic elastomer, ethylene copolymer thermoplastic elastomer) (EVA), thermoplastic 1,2-poly-butadiene elastomer, thermoplastic trans-polyisoprene elastomer, melt processible thermoplastic elastomer (Alcryn), thermoplastic vulcanizates (TPV), and any combinations thereof.

According to one embodiment of the present disclosure, the second sealing layer can be formed by mixing the third waterborne adhesive, the third elastic particles and any optional additives to form a mixture of the third group of raw materials, wherein the mixture can be properly handled by stirring, shearing, concentrating, dilution, compatibilization, or modification with adjuvant(s) so as to achieve consistency and flowability suitable for storage, transportation, and application by ordinary coating technologies such as spraying coating, blade coating, curtain coating, flow coating, slit coating, die coating, dip coating, and the like. Then the mixture of the third group of raw materials is applied onto the surface of the first sealing layer to form a wet (green/uncured) second sealing layer, followed by drying, curing or allowing it to dry. According to one embodiment of the present application, the second sealing layer may have a thickness of 0.5 to 3 mm, such as 0.8 to 2.8 mm, or from 0.9 to 2.5 mm, or from 1 to 2.2 mm, or from 1.2 to 2.0 mm, or from 1.5 to 1.8 mm, or from 1.6 to 1.7 mm The Top Layer According to some embodiments of the present disclosure, the top layer (d) can be prepared by applying a mixture of a fourth group of raw materials onto the top of the second sealing layer to form a wet/green (uncured) top layer, and then curing the wet/green (uncured) top layer or allowing it to cure. The mixture of the fourth group of raw materials can be in the form of a dispersion, a suspension, an emulsion or a slurry. According to one embodiment of the present application, the mixture of the fourth group of raw materials only comprises water as the sole solvent and is completely free of any organic solvent.

The fourth group of raw materials comprise a fourth waterborne adhesive, optional solid filler particles, and optional additive(s) selected from the group consisting of thickener, surfactant, emulsifier, promoter, gelling agent, light stabilizer, pigments, dye, strengthening agent, anti-abrasion agent, anti-weathering agent, toughening agent, flow modifier, adhesion promoter, plasticizer, catalyst, catalyst de-activator, anti-mildew agent, and any combinations thereof.

According to one embodiment of the present disclosure, the content of the fourth waterborne adhesive can be from 80 wt % to 100 wt %, based on the total weight of the fourth group of raw materials. For example, the content of the fourth waterborne adhesive can be from 81 wt % to 99 wt %, or in a numerical range obtained by combining any two of the following percentage values: 80 wt %, or 81 wt %, or 82 wt %, or 83 wt %, or 84 wt %, or 85 wt %, or 86 wt %, or 87 wt %, or 88 wt %, or 89 wt %, or 90 wt %, or 91 wt %, or 92 wt %, or 93 wt %, or 94 wt %, or 95 wt %, or 96 wt %, or 97 wt %, or 98 wt %, or 99 wt %, or 100 wt %.

According to one embodiment of the present disclosure, the fourth waterborne adhesive can be in the form of an aqueous dispersion, suspension, emulsion, latex, or slurry, and having a solid content of 20 wt % to 60 wt %, based on the total weight of the fourth waterborne adhesive, such as having a solid content from 25 wt % to 50 wt %, or from 30 wt % to 40 wt %, or in a numerical range obtained by combining any two of the following percentage values: 20 wt %, or 21 wt %, or 22 wt %, or 23 wt %, or 24 wt %, or 25 wt %, or 26 wt %, or 27 wt %, or 28 wt %, or 29 wt %, or 30 wt %, or 31 wt %, or 32 wt %, or 33 wt %, or 34 wt %, or 35 wt %, or 36 wt %, or 37 wt %, or 38 wt %, or 39 wt %, or 40 wt %, or 41 wt %, or 42 wt %, or 43 wt %, or 44 wt %, or 45 wt %, or 46 wt %, or 47 wt %, or 48 wt %, or 49 wt %, or 50 wt %, or 51 wt %, or 52 wt %, or 53 wt %, or 54 wt %, or 55 wt %, or 56 wt %, or 57 wt %, or 58 wt %, or 59 wt %, or 60 wt %. The solid component in the fourth waterborne adhesive comprises water-miscible polymer(s) selected from the group consisting of poly(meth) acrylic polymer, polyurethane, polysiloxane, polyvinyl acetate latex, styrenic resin, styrene-acrylic resin, linseed resin, soya oil resin, alkyd resin and any copolymers or combinations thereof. Preferably the solid component in the fourth waterborne adhesive is a poly(meth)acrylic polymer or a copolymer thereof, and the fourth waterborne adhesive is a waterborne acrylic adhesive.

According to an embodiment of the present application, the fourth waterborne adhesive is a waterborne acrylic adhesive derived from the polymerization of one or more acrylic monomer selected from the group consisting of acrylic acid, methacrylic acid, hydroxyethyl methacrylate, methyl acrylate, methyl methacrylate, ethyl acrylate, butyl acrylate, butyl methacrylate, 2-ethylhexyl acrylate, 3-butanediol dimethacrylate, acrylonitrile, iso-butyl (meth)acrylate, hexyl(meth)acrylate, lauryl (meth)acrylate, stearyl (meth)acrylate, cyclohexyl (meth)acrylate, benzyl(meth) acrylate, oleyl(meth)acrylate, palmityl(meth)acrylate, nonyl (meth)acrylate, decyl(meth)acrylate, dodecyl (meth)acrylate, pentadecyl(meth)acrylate, hexadecyl(meth)acrylate, octadecyl(meth)acrylate, hydroxyethyl (meth)acrylate, hydroxypropyl (meth)acrylate, acrylamide, methacrylamide, allyl(meth)acrylate, 2-methylallyl(meth)acrylate, allyl (meth)acrylamide, 2-methylallyl(meth)acrylamide, allyl oxyethyl (meth)acrylate, 2-methylallyl oxyethyl (meth)acrylate, crotyl(meth)acrylate, dicyclopentenyl(meth)acrylate, dicyclopentenyl ethyl (meth)acrylate, and diallyl maleate. Ordinary additives, such as catalyst, cocatalyst, chain transferring agent, initiator or surfactant, can be properly introduced during the above said polymerization. According to another embodiment of the present disclosure, the waterborne acrylic adhesive comprises from an acrylic emulsion (co)polymer having a Tg of at least 15° C. and an acrylic emulsion (copolymer) having a Tg of −5° C. or less.

According to an embodiment of the present disclosure, the second sealing layer is free of any phase change material or elastic particles.

According to one embodiment of the present disclosure, the content of the solid filler particle is from 0 wt % to 20 wt %, based on the total weight of the fourth group of raw materials. For example, the content of the solid filler particle can be from 0 wt % to 19 wt %, or in a numerical range obtained by combining any two of the following percentage values: 0 wt %, or 1 wt %, or 2 wt %, or 3 wt %, or 4 wt %, or 5 wt %, or 6 wt %, or 7 wt %, or 8 wt %, or 9 wt %, or 10 wt %, or 11 wt %, or 12 wt %, or 13 wt %, or 14 wt %, or 15 wt %, or 16 wt %, or 17 wt %, or 18 wt %, or 19 wt %, or 20 wt %.

According to one embodiment of the present disclosure, the solid filler particle is selected from the group consisting of silica sand, carbon particle, calcium carbonate, bentonite, organobentonite, talc, wollastonite, mica, calcined limestone, barium sulphate, rutile titania, pyrogenic silica, and any combinations thereof. According to one embodiment of the present disclosure, the solid filler particle has a particle size of about 10 to 800 mesh, or from 20 to 500 mesh, or from 30 to 400 mesh, or from 40 to 300 mesh, or from 50 to 200 mesh, or from to 150 mesh, or from 80 to 120 mesh.

According to one embodiment of the present disclosure, the top layer can be formed by mixing the fourth waterborne adhesive, the solid filler particles and any optional additives to form a mixture of the fourth group of raw materials, wherein the mixture can be properly handled by stirring, shearing, concentrating, dilution, compatibilization, or modification with adjuvant(s) so as to achieve consistency and flowability suitable for storage, transportation, and application by ordinary coating technologies such as spraying coating, blade coating, curtain coating, flow coating, slit coating, die coating, dip coating, and the like. Then the mixture of the fourth group of raw materials is applied onto the surface of the second sealing layer to form a wet (green/uncured) top layer, followed by drying, curing or allowing it to dry. According to one embodiment of the present application, the top layer may have a thickness of to 0.60 mm, such as 0.20 to 0.55 mm, or from 0.25 to 0.50 mm, or from 0.30 to 0.45 mm, or from 0.35 to 0.40 mm, or from 0.38 to 0.39 mm.

According to an embodiment of the present disclosure, the top layer is not hydrophobic.

On the basis of the particularly designed formulations and structures of the multi-layered laminate material, the following benefits have been successfully achieved:

a) High anti-icing activity and anti-slippery property;
b) Extremely high heat capacity;
b) No fire risk or pungent odor during application;
c) Superior structural integrity and mechanical properties such as elasticity, impact resistance, and wear resistance;
d) Excellent weather resistance and thermal shock resistance;
e) Prevention of leakage of liquid PCM materials; and
f) Excellent cost-effectiveness.

Examples

Some embodiments of the invention will now be described in the following Examples, wherein all parts and percentages are by weight unless otherwise specified. However, the scope of the present disclosure is not, of course, limited to the formulations set forth in these examples. Rather, the Examples are merely inventive of the disclosure.

BA (Butyl acrylate), MMA (Methyl methacrylate), MAA (Methacrylic acid), AM (Acrylamide) and EHA (2-ethylhexyl acrylate) are commercial products. The information of the raw materials used in the examples is listed in the following table 1:

TABLE 1

Raw materials used in the examples

| Grade name | Characterization | Vendor |
|---|---|---|
| OPE 5E | Wax-based phase change material (PCM) having a phase change temperature of 5° C. | Hangzhou Ruhr New Material Technology Co., Ltd. |
| HPG | Thickener, 2-Hydroxypropyl ether guar | Sino Chemical Reagent Company |
| ECOSURF ™ SA-4 | Surfactant | The Dow Chemical Company |
| ECOSURF ™ SA-9 | Surfactant | The Dow Chemical Company |
| HYPOL JT 6005 | Binder, Isocyanate Prepolymer | The Dow Chemical Company |
| Phosphoric acid | Acid, phosphoric acid, | Sino Chemical Reagent Company |

TABLE 1-continued

| Raw materials used in the examples | | |
|---|---|---|
| Grade name | Characterization | Vendor |
| XCM-882 | Promoter | Nanjing Aikesaite |
| EPDM rubber granules | EPDM rubber granules with the size of 2-4 mm and original color | Suzhou Mahayana |
| EPDM rubber powder | EPDM powder with the size of <0.5 mm | Suzhou Mahayana |
| NOPCO NXZ | Defoamer | Henkel |
| ACRYSOL RM-8W | Thickener | The Dow Chemical Company |
| BAYHYDUR XP2655 | Isocyanate-based crosslinking agent | Bayer Material Science AG |
| COATOSIL 2287 | Silane-based crosslinking agent | Momentive Performance Materials Inc. |
| Solid filler | Quartz sand, 100 mesh | Suzhou Mahayana |

Example 1: The Preparation of PCM Emulsion, PCM Gel and Waterborne Adhesive

The Preparation of the PCM Emulsion

The PCM emulsion was prepared by adding 40 g OPE5E, 36.3 g HPG (2 wt % aqueous solution), 0.3 g SA-4, 0.24 g SA-9, 22.1 g DI water and 1 g Phosphoric Acid (5 wt % aqueous solution) into a flask, then stirring the mixed substances under a stirring rate of 1500 rpm at room temperature for 10 minutes to form 100 g PCM emulsion.

The Preparation of the PCM Gel

The PCM gel was prepared by adding 12 g HYPOL JT 6000 into the above stated emulsion and then stirring the mixed substances at a stirring rate of 2000 rpm for 8 seconds. After that, the mixture was poured into a container to form a PCM gel, which was then cut into granules with a size of around 3 mm The Preparation of the Waterborne Adhesive An acrylic latex A having a composition of 66.0 BA/0.9 MAA/33.1 MMA was prepared by an aqueous emulsion polymerization of the above stated comonomers at room temperature, and the resultant acrylic latex A has a Tg of −35° C., a pH of 7.5 and a solid content of 55 wt %. An acrylic latex B having a composition of 0.5 AM/40.5 EHA/2.0 MAA/57.0 MMA was prepared by an aqueous emulsion polymerization of the above stated comonomers at room temperature, and the resultant acrylic latex B has a Tg of 28° C., a pH of 8 and a solid content of 46.5 wt %. Then 63.27 g latex A, 31.63 g latex B, 0.20 g NOPCO NXZ defoamer, 0.15 g ACRYSOL RM-8W thickener, 2.85 g BAYHYDUR XP2655 isocyanate-based crosslinking agent and 1.90 g COATROSIL 2287 silane-based crosslinking agent were thoroughly mixed to obtain the waterborne adhesive.

The PCM emulsion, PCM gel and waterborne adhesive prepared in this example were used for preparing laminate materials in the following Examples.

Example 2-6 and Comparative Example 1: The Preparation of Laminate Materials

In the examples 2-6 and Comparative Example 1, laminate materials were prepared by using the formulations shown in Table 2.

The waterborne adhesive, XCM-882 promoter, EPDM granules and PCM granules (when present) were mixed together to form an aqueous suspension, which was then applied onto a smooth surface of a concrete block having a dimension of 60 cm×40 cm×4 cm, and then cured at room temperature for 24 hours to form a base mat layer having a thickness of about 8 mm.

The waterborne adhesive, XCM-882 promoter, EPDM powder and PCM emulsion (when present) were mixed together to form an aqueous suspension, which was then applied onto the cured base mat layer, and then cured at room temperature for 24 hours to form the first sealing layer having a thickness of about 2 mm.

The waterborne adhesive, XCM-882 promoter and EPDM powder were mixed together to form an aqueous suspension, which was then applied onto the cured first sealing layer, and then cured at room temperature for 24 hours to form the second sealing layer having a thickness of about 2 mm.

Finally, the waterborne adhesive and solid fillers were mixed together to form an aqueous suspension, which was then applied onto the top of the cured second sealing coating, and then cured at room temperature for 24 hours to form the top layer having a thickness of about 0.3 mm

TABLE 2

| Formulations of base mat layer, seal coating layer and top layer | | | | | | | |
|---|---|---|---|---|---|---|---|
| | | Comparative Example 1 | Example 2 | Example 3 | Example 4 | Example 5 | Example 6 |
| BASE | Waterborne adhesive | 1000.00 | 1000.00 | 1000.00 | 1000.00 | 1000.00 | 1000.00 |
| MAT | XCM-882 promoter | 50.00 | 50.00 | 50.00 | 50.00 | 50.00 | 50.00 |
| LAYER | PCM granules | 0 | 1200.00 | 2000.00 | 2800.00 | 3000.00 | 3200.00 |
| | EPDM granules | 4000.00 | 2800.00 | 2000.00 | 1200.00 | 1000.00 | 800.00 |
| 1st | Waterborne adhesive | 1000.00 | 700.00 | 500.00 | 300.00 | 200.00 | 250.00 |
| SEALING | PCM emulsion | 0 | 300.00 | 500.00 | 700.00 | 800.00 | 750.00 |
| LAYER | XCM-882 promoter | 50.00 | 50.00 | 50.00 | 50.00 | 50.00 | 50.00 |
| | EPDM powder | 700.000 | 700.000 | 700.000 | 700.000 | 700.000 | 700.000 |

TABLE 2-continued

| Formulations of base mat layer, seal coating layer and top layer | | | | | | | |
|---|---|---|---|---|---|---|---|
| | | Comparative Example 1 | Example 2 | Example 3 | Example 4 | Example 5 | Example 6 |
| 2nd | Waterborne adhesive | 1000 | 1000 | 1000 | 1000 | 1000 | 1000 |
| SEALING | XCM-882 promoter | 50.00 | 50.00 | 50.00 | 50.00 | 50.00 | 50.00 |
| LAYER | EPDM powder | 700.0 | 700.0 | 700.0 | 700.0 | 700.0 | 700.0 |
| TOP | Waterborne adhesive | 900 | 900 | 900 | 900 | 900 | 900 |
| LAYER | Solid filler | 100 | 100 | 100 | 100 | 100 | 100 |
| | Total | 9550.0 | 9550.0 | 9550.0 | 9550.0 | 9550.0 | 9550.0 |

Note:
the amount of each component was by gram

The laminate materials prepared in the above examples, including Comparative Example 1, were separately stored in the lab at ambient temperature (21-23° C.) for at least 24 hours to keep their temperature stable. Then they were transmitted into two refrigerators set at −20° C. and −10° C. respectively to evaluate the anti-freezing property (i.e. the ability for inhibiting the decrease of surface temperature) thereof. An infrared thermometer was used to measure the surface of each sample with a time interval of 5 minutes.

Figure 2:
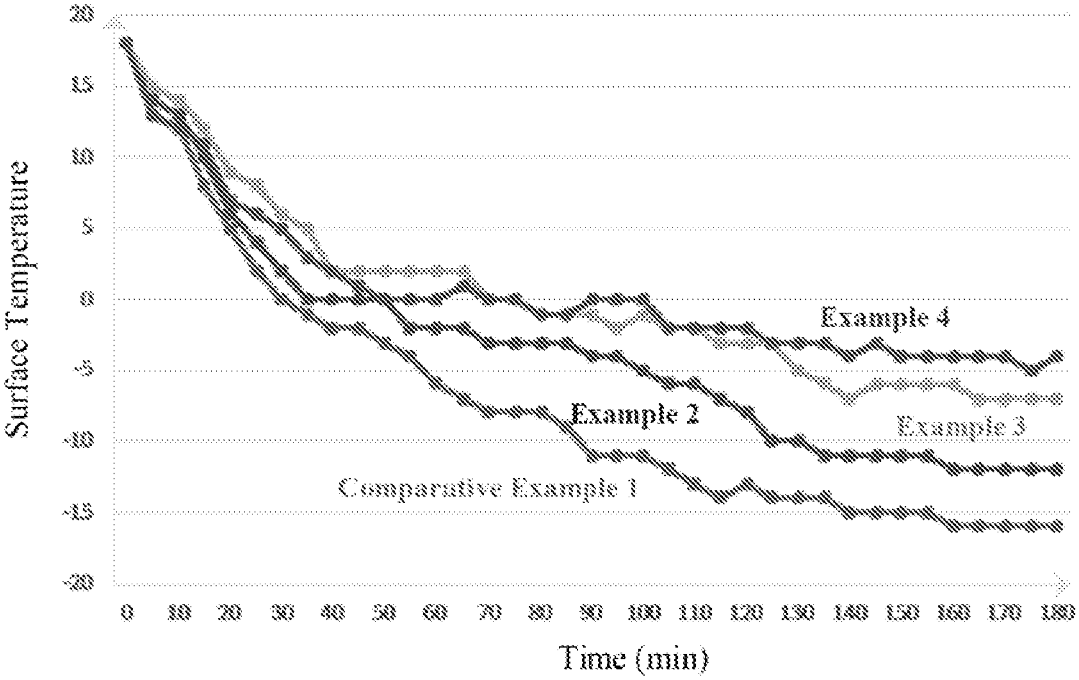
FIG. 2 shows the surface temperature-time plots of some inventive and comparative laminate materials characterized in a refrigerator set at −20° C.

The surface temperature-time plots of these samples characterized in the refrigerator set at −20° C. are shown in FIG. 2. As can be seen from FIG. 2, the surface temperature of each sample started to decrease immediately after it was put into the refrigerator. For Comparative Example 1 which was taken as a benchmark and had no PCM added therein, the slop of the curve is the sharpest in the range of 5 to 0° C. and no plateau occurred. While for the inventive examples 2-4 in which part of EPDM granules were replaced with PCM granules and part of waterborne binder was replaced with PCM emulsion, the slop of the curves become milder and a plateau was formed in the temperature range of 5 to 0° C. Example 4 exhibited a plateau of roughly 55 min., Example 3 exhibited a plateau of roughly 35 min., and Example 2 exhibited a plateau of roughly 15 min, thus Example 4 had higher ability for keeping the surface at positive temperature. As can be seen, the introduction of PCM into such elastomeric laminate flooring surface is able to maintain the surface temperature higher than 0° C. for a period to melt snow or ice.

Figure 3:
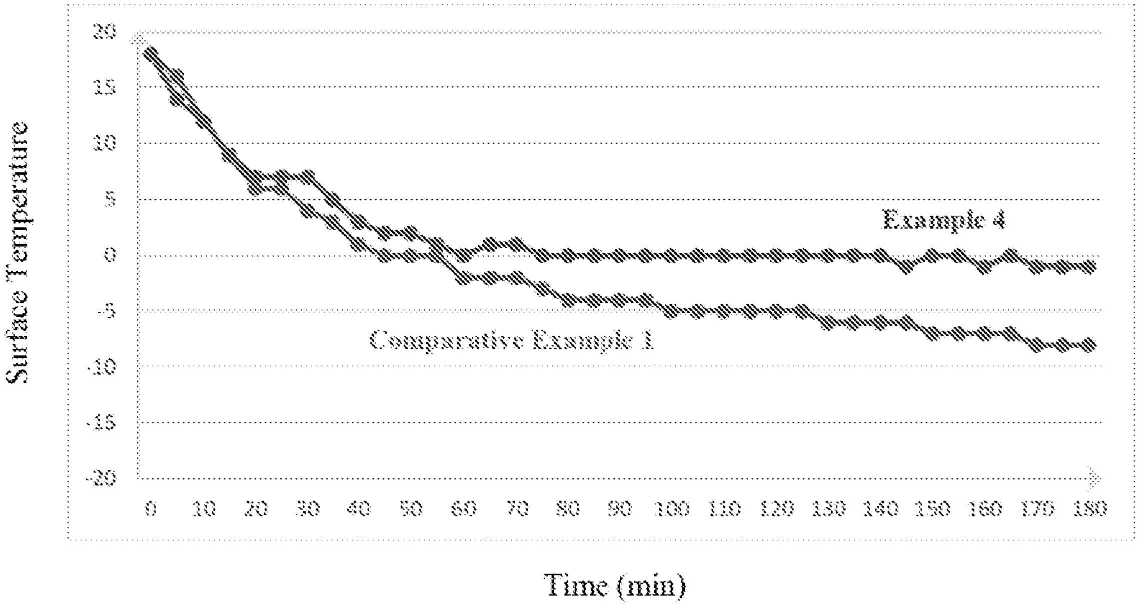
FIG. 3 shows the surface temperature-time plots of one inventive laminate material and one comparative laminate material characterized in a refrigerator set at −10° C.

FIG. 3 shows the surface temperature-time plots of Example 4 and Comparative Example 1 characterized in the refrigerator set at −10° C. It can be seen that regarding the sample of comparative example 1, which was taken as the benchmark, only a very short plateau (roughly 10 min) occurred in the temperature range of 5 to 0° C., while regarding the sample of Example 4, a much longer plateau of roughly 2 hours occurred in the temperature range of 5 to 0° C., roughly 2 hours. Besides, the sample of Example 4 exhibits a plateau (2 hours) at −10° C. much longer than that at −20° C. (roughly 55 min.).

Example 5 and 6 were similarly characterized and the plateau durations of all the samples were summarized in Table 3:

TABLE 3

| The plateau duration of Examples 2-6 and Comparative Example 1 | | | | | | |
|---|---|---|---|---|---|---|
| | Comparative Example 1 | Example 2 | Example 3 | Example 4 | Example 5 | Example 6 |
| −20° C. plateau (min.) | None | 15 | 35 | 55 | 63 | 72 |
| −10° C. plateau (min.) | 10 | 24 | 78 | 120 | 153 | 182 |

Ice Melting Test:

The ice-melting test for evaluating the anti-icing property was conducted by keeping a sample at ambient environment for at least 24 hours, and then transmitting the sample into a box lined with XPS foam. Identical amount of crushed ice (400 g) was uniformly spread onto the top surface of the sample, then the box was put into a refrigerator set at −10° C. The time point at which the ice completely melt was recorded.

Figure 4:
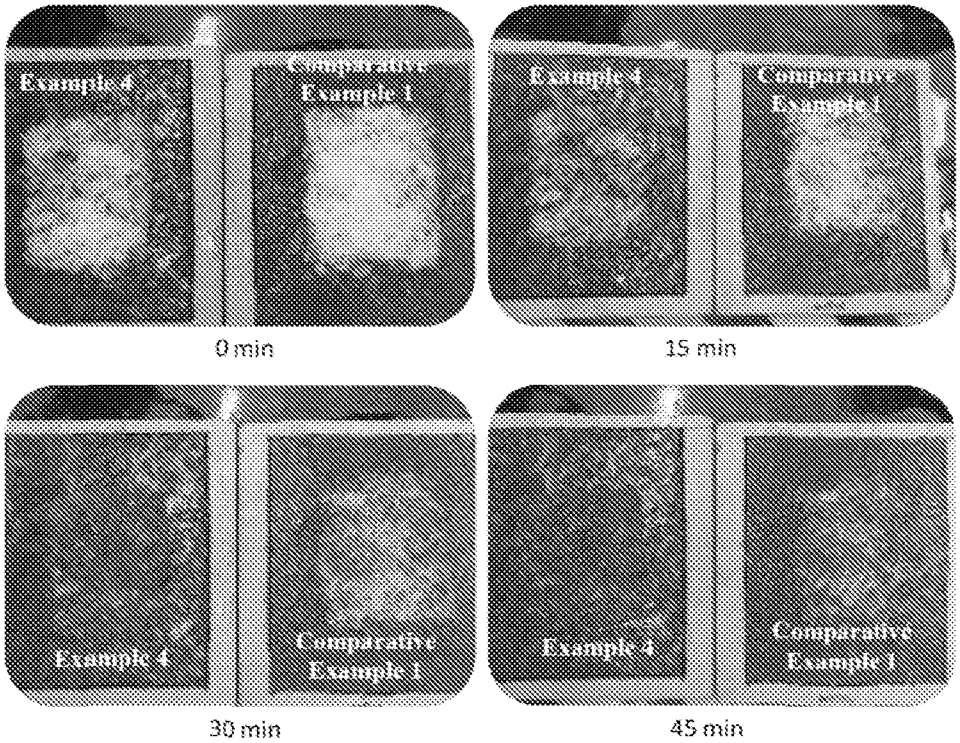
FIG. 4 shows the comparison of anti-icing properties between one inventive laminate material and one comparative laminate material.

FIG. 4 shows the photographs of Example 4 and Comparative Example 1 at different time, from which the laminate material of Example 4 could achieve a complete ice melting much faster than that of the Comparative Example 1.

All the Examples were similarly characterized and the plateau durations of all the samples were summarized in Table 4:

TABLE 4

| The ice melting property of Examples 2-6 and Comparative Example 1 | | | | | | |
|---|---|---|---|---|---|---|
| | Comparative Example 1 | Example 2 | Example 3 | Example 4 | Example 5 | Example 6 |
| Complete ice melting time (min.) | 63 | 52 | 48 | 45 | 38 | 30 |

What is claimed is:

1. An anti-icing laminate material comprising, in a sequence from bottom to top:

(a) a base mat layer, derived from a first group of raw materials comprising (i) a first waterborne adhesive in an amount from 10 wt % to 50 wt % based on the total weight of the first group of raw materials, (ii) a gel of a first phase change material in an amount from 20 wt % to 70 wt % based on the total weight of the first group of raw materials, wherein the gel comprises the first phase change material and a binder and wherein the binder comprises a polyurethane binder or an isocyanate prepolymer binder, and (iii) first elastic particles in an amount from 20 wt % to 70 wt % based on the total weight of the first group of raw materials, wherein the base mat layer has a thickness of 5 to 20 mm;

(b) a first sealing layer, derived from a second group of raw materials comprising a second waterborne adhesive, an emulsion of a second phase change material, and second elastic particles;

(c) a second sealing layer, derived from a third group of raw materials comprising a third waterborne adhesive and third elastic particles, wherein the second sealing layer is free of any phase change material; and (d) a top layer derived from a fourth group of raw materials comprising a fourth waterborne adhesive and optional solid filler particles, wherein the top layer is free of any phase change material and wherein the top layer has a thickness of up to 0.60 mm;

wherein each of the first, second, third and fourth waterborne adhesives is in the form of an aqueous dispersion and independently comprises water-miscible polymer (s) selected from the group consisting of poly (meth) acrylic polymer, polyurethane, polysiloxane, polyvinyl acetate latex, styrenic resin, styrene-acrylic resin, linseed resin, soya oil resin, alkyd resin and any copolymers or combinations thereof;

wherein each of the first and second phase change materials are independently selected from the group consisting of silicone phase change material, fully refined paraffin phase change material, half refined paraffin phase change material, organic carboxylic acid phase change material, inorganic salt phase change material, hydrated salt phase change material, and any combinations thereof; and wherein each of the first, second and third elastic particles is formed by material(s) independently selected from the group consisting of natural rubber, synthetic rubber, polyolefin elastomer, poly (alkylene halide) elastomer, poly (meth) acrylic elastomer, polyurethane elastomer, polystyrene elastomer, polyester elastomer, polyamide elastomer, polysiloxane, soft wood, and any combinations thereof.

2. The laminate material according to claim 1, further comprising a primer layer beneath the base mat layer.

3. The laminate material according to claim 1, wherein neither the first phase change material nor the second phase change material is encapsulated.

4. The laminate material according to claim 1, wherein each of the base mat layer, first sealing layer, second sealing layer and top layer independently comprises optional additive(s) independently selected from the group consisting of thickener, filler, surfactant, emulsifier, promoter, gelling agent, light stabilizer, pigments, dye, strengthening agent, anti-abrasion agent, anti-weathering agent, toughening agent, flow modifier, adhesion promoter, plasticizer, catalyst, catalyst de-activator, anti-mildew agent, and any combinations thereof.

5. The laminate material according to claim 1, wherein the second group of raw materials comprise 10-50 wt % of the second waterborne adhesive and 10-50 wt % of the emulsion of the second phase change material, and 25-70 wt % of the second elastic particles, based on the total weight of the second group of raw materials; and/or the third group of raw materials comprise 30-70 wt % of the third waterborne adhesive, and 30-70 wt % of the third elastic particles, based on the total weight of the third group of raw materials; and/or the fourth group of raw materials comprise 80-100 wt % of the fourth waterborne adhesive and 0-20 wt % of the solid filler particles, based on the total weight of the fourth group of raw materials.

6. A method for inhibiting the formation or accumulation of ice or snow on the surface of an article, comprising layering the anti-icing laminate material of claim 1 above the surface of the article, wherein the base mat layer is in contact with the surface of the article or with an optional primer layer on the surface of the article, and wherein the layers are applied in sequence above the surface of the article:

(a) the base mat layer;

(b) the first sealing layer;

(c) a the second sealing layer; and (d) the top layer.

7. The method according to claim 6, further comprising applying a primer layer onto the surface of the article before applying in sequence the base mat layer, the first sealing layer, the second sealing layer, and the top layer.

* * * * *